United States Patent
Buckley

(10) Patent No.: US 10,895,848 B1
(45) Date of Patent: Jan. 19, 2021

(54) METHODS AND APPARATUS FOR SELECTIVE HISTOGRAMMING

(71) Applicant: SEMICONDUCTOR COMPONENTS INDUSTRIES, LLC, Phoenix, AZ (US)

(72) Inventor: Steven John Buckley, Henlow (GB)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/821,106

(22) Filed: Mar. 17, 2020

(51) Int. Cl.
| | |
|---|---|
| *H03M 1/50* | (2006.01) |
| *G04F 10/00* | (2006.01) |
| *G01S 7/4861* | (2020.01) |
| *G01S 17/10* | (2020.01) |

(52) U.S. Cl.
CPC .......... *G04F 10/005* (2013.01); *G01S 7/4861* (2013.01); *G01S 17/10* (2013.01)

(58) Field of Classification Search
CPC ...... G04F 10/005; G01S 7/4861; G01S 17/10; H03M 1/00; H03M 7/00; H03M 5/00
USPC ............................................. 341/50, 51, 166
See application file for complete search history.

(56) References Cited

U.S. PATENT DOCUMENTS

| | | | | | |
|---|---|---|---|---|---|
| 5,991,308 | A * | 11/1999 | Fuhrmann | ........... | H03M 13/256 370/395.53 |
| 6,272,176 | B1 * | 8/2001 | Srinivasan | ............. | H04H 20/31 375/240 |
| 6,535,150 | B1 * | 3/2003 | Ross | .................... | G06F 16/2237 341/67 |
| 6,807,230 | B2 * | 10/2004 | Srinivasan | ............. | H04H 20/31 375/240 |
| 6,829,695 | B1 * | 12/2004 | Ross | .................... | G06F 16/2237 712/1 |
| 6,847,242 | B2 * | 1/2005 | Chung | ...................... | G11C 7/16 327/158 |
| 7,256,627 | B1 * | 8/2007 | Talbot | ....................... | G06F 1/12 327/141 |
| 8,198,926 | B2 * | 6/2012 | Fujita | ................... | H03L 7/0812 327/156 |
| 8,446,483 | B2 * | 5/2013 | Ui | ........................... | H03M 1/14 348/222.1 |
| 9,270,290 | B2 * | 2/2016 | Tsai | ........................ | H03L 7/085 |
| 9,632,486 | B2 * | 4/2017 | Tsai | ...................... | G04F 10/005 |
| 10,715,754 | B2 * | 7/2020 | Moore | .................. | G01S 7/4865 |
| 2001/0053190 | A1 * | 12/2001 | Srinivasan | ............. | H04H 60/39 375/340 |

(Continued)

OTHER PUBLICATIONS

Neale A. W. Dutton et al., A Time-correlated Single-photon-counting Sensor with 14GS/s Histogramming Time-to-Digital Converter, 2015 IEEE International Solid-State Circuits Conference, Feb. 24, 2015, Sensors and Imagers for Life Sciences.

(Continued)

*Primary Examiner* — Jean B Jeanglaude
(74) *Attorney, Agent, or Firm* — The Noblitt Group, PLLC; Hettie L. Haines

(57) ABSTRACT

Methods and apparatus for selective histogramming are configured to histogram a total number of virtual bins over a plurality of phases using a total number of counters, wherein the total number of counters is less than the total number of virtual bins.

20 Claims, 3 Drawing Sheets

(56) References Cited

U.S. PATENT DOCUMENTS

| | | | | |
|---|---|---|---|---|
| 2003/0194004 A1* | 10/2003 | Srinivasan | ............. | H04H 20/33 |
| | | | | 375/240 |
| 2004/0174928 A1* | 9/2004 | Siwiak | ................... | H04L 5/026 |
| | | | | 375/146 |
| 2010/0271519 A1* | 10/2010 | Ui | .......................... | H04N 5/378 |
| | | | | 348/302 |
| 2013/0339327 A1* | 12/2013 | Belmar | ................... | G06F 13/24 |
| | | | | 707/703 |
| 2014/0333358 A1* | 11/2014 | Kim | ...................... | H03L 7/1974 |
| | | | | 327/159 |

OTHER PUBLICATIONS

Neale Dutton et al., Multiple-Event Direct to Histogram TDC in 65nm FPGA Technology, 2014 10th Conference on Ph. D. Research in Microelectronics and Electronics, 2014.

Ion Vornicu et al., Compact Real-Time Inter-Frame Histogram Builder for 15-Bits High-Speed ToF-Imagers Based on Single-Photon Detection, IEEE Sensors Journal, vol. 19, No. 6, pp. 2181-2190, Mar. 15, 2019.

\* cited by examiner

METHODS AND APPARATUS FOR SELECTIVE HISTOGRAMMING

BACKGROUND OF THE TECHNOLOGY

Active ranging systems, such as a LiDAR system, often create a histogram in memory based on time events of an optical detector (e.g., a single-photon avalanche diode (SPAD) array of 640×480 pixels). The peak of the histogram is used to determine the travel time of a transmitted laser signal to return to the optical detector from the initial transmission. The amount of memory required to create the histogram may increase the chip to an impractical size.

SUMMARY OF THE INVENTION

Various embodiments of the present technology may provide methods and apparatus for selective histogramming. The apparatus may histogram a total number of virtual bins over a plurality of phases using a total number of counters, wherein the total number of counters is less than the total number of virtual bins.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various logic gates, latches, counters, state machines, memory, and the like, which may carry out a variety of functions. In addition, the present technology may be integrated in any number of electronic systems, such as automotive, aviation, surveillance, "smart devices," and consumer electronics, and the systems described are merely exemplary applications for the technology.

Figure 1:
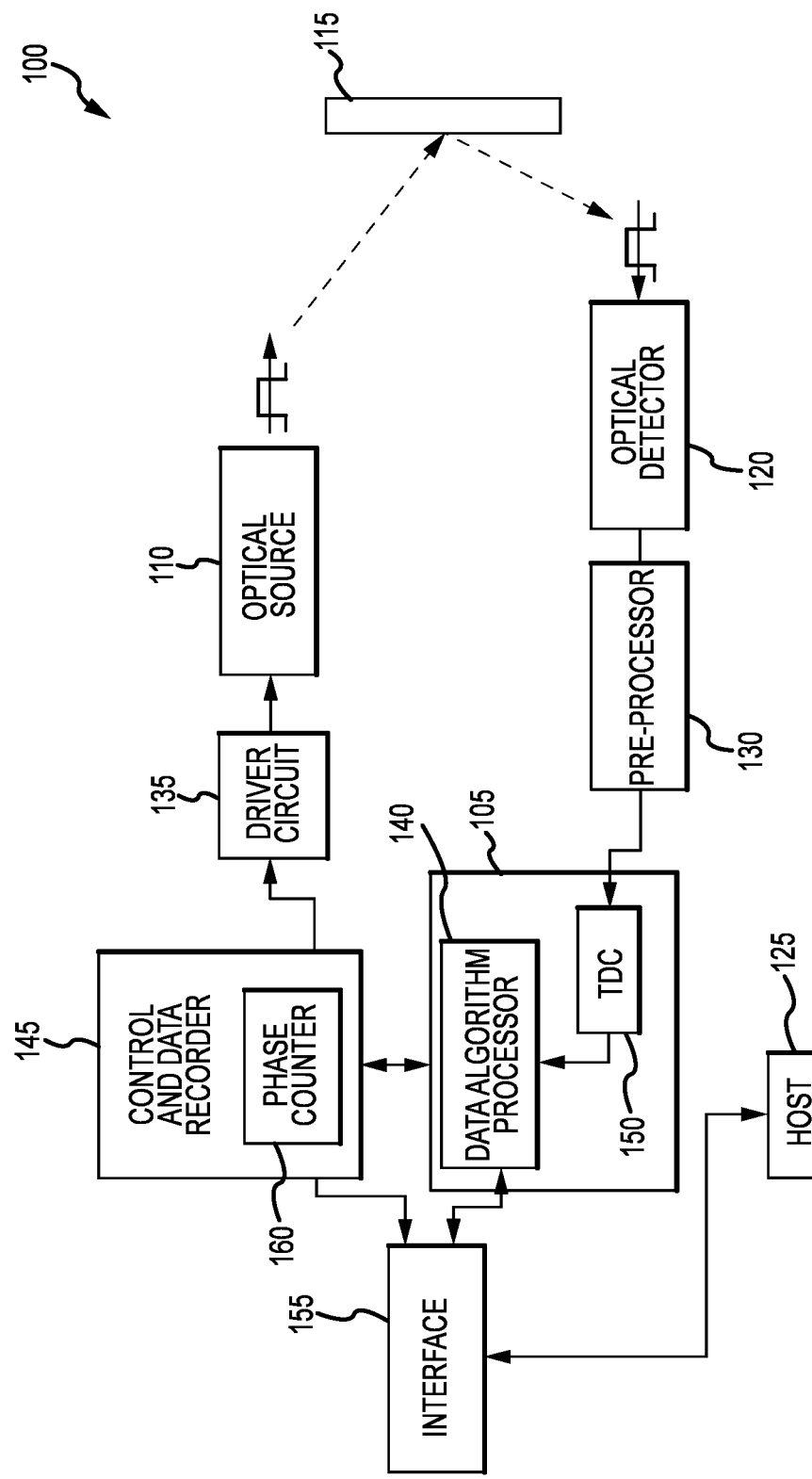
FIG. 1 is a block diagram of a system in accordance with an exemplary embodiment of the present technology.
Figure 2:
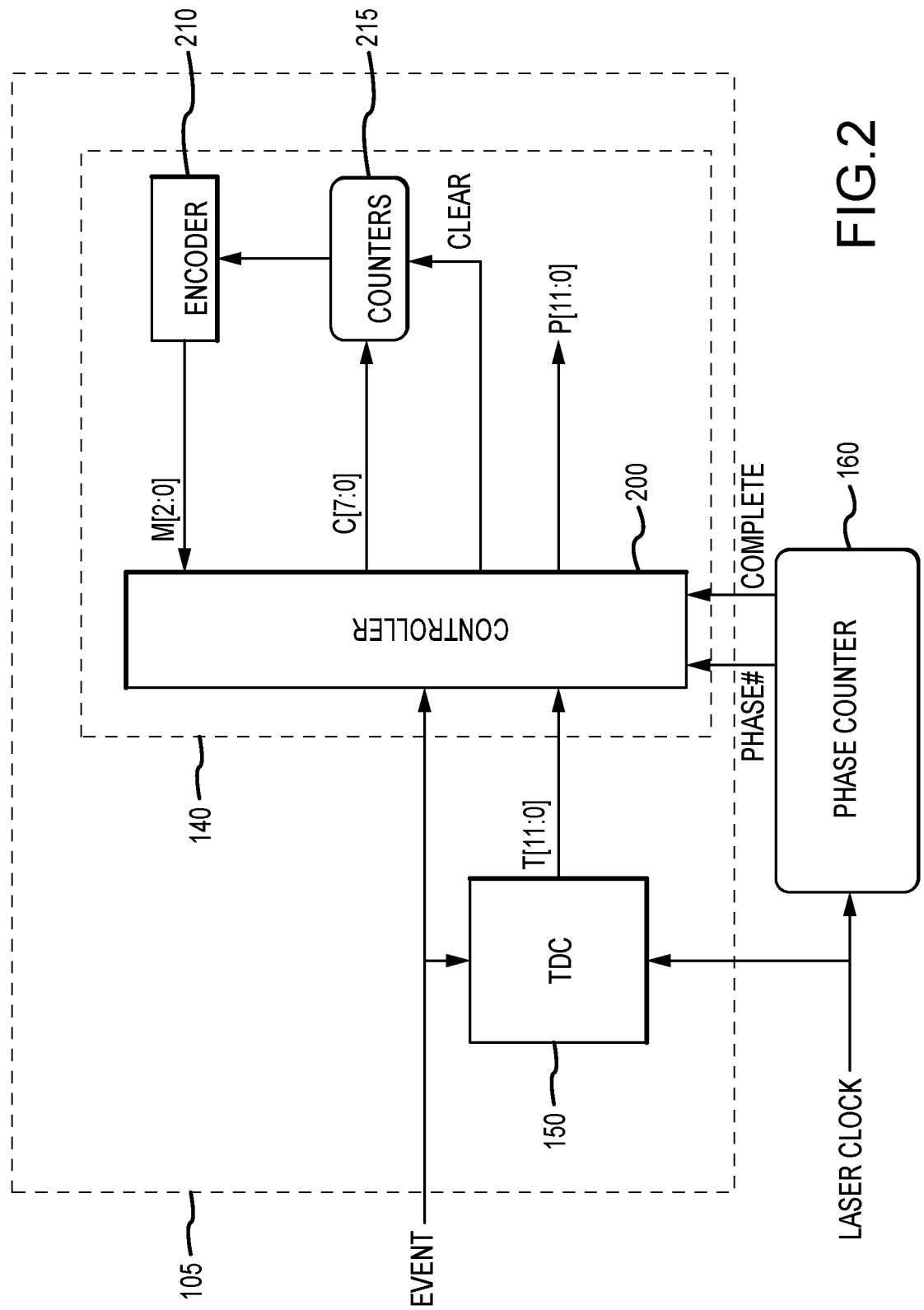
FIG. 2 is a partial block diagram of the system in accordance with an exemplary embodiment of the present technology.

Referring to FIGS. 1 and 2, methods and apparatus for selective histogramming according to various aspects of the present technology may be integrated in an active ranging sensor system 100, such as such as a light detection and ranging (LiDAR) system, configured to transmit a pulse, detect a reflected pulse, and determine a range to a target based on the time delay between the transmitted pulse to the detected pulse (i.e., the round trip delay) In general, LiDAR systems and other active ranging sensors may measure range to a target 115 by direct time of flight (the round trip delay). In this method, an optical source 110 (e.g., a laser), which is driven by a driver circuit 135, fires a laser pulse (transmission signal) at the target 115 and a returning photon reflected from the target 115 is detected by an optical detector 120, such as a single photon avalanche diode (SPAD) or silicon photomultipliers (SiPM). A number of SPADs may be arranged in an array, with each SPAD connected to its own dedicated processing circuitry, such as a pre-processor 130 and a processor 105. In other words, the system 100 may comprise a plurality of pre-processors and a plurality of processors, one for each SPAD.

The system 100 may further comprise a control and data recorder 145 configured to communicate with the processor 105 and pass (relay) the relevant information to a host 125 via an interface 155. The control and data recorder 145 may also receive configuration data from the host 125 via the interface 155. The control and data recorder 145 may use the configuration data from the host 125 to drive the driver circuit 135 and generate a laser clock signal. For example, the configuration data may indicate a frequency of the laser clock signal and/or operation timing of the driver circuit 135. The control and data recorder 145 may supply the laser clock signal to a phase counter 160 and the processor 105.

According to an exemplary embodiment, the control and data recorder 145 may comprise the phase counter 160, wherein the phase counter 160 is configured to generate a phase number and a complete signal (COMPLETE). The phase counter 160 may be in communication with the processor 105. For example, the phase counter 160 may supply the phase number and complete signal to the processor 105. The phase counter 160 may increment its phase number according to the laser clock signal (LASER CLOCK). For example, the phase counter 160 may be configured to increment after a predetermined number of pulses in the laser clock signal. The phase counter 160 may be further configured to increment to a maximum count value and generate the complete signal after the maximum count value is reached. The phase counter 160 may comprise any number of circuits and/or systems suitable generating a count value up to a maximum count value according to an input signal, such as a clock signal, and generating a signal to indicate when the maximum count value has been reached. The phase number may be represented in binary or decimal form.

The interface 155 may be configured to relay various data and configuration data to/from various circuits in the system 100 and may comprise a number of I/O terminals to communicate with the processor 105, the control and data recorder 145, and the host 125. For example, the interface 155 may be configured to receive data from the processor 105, send configuration signals to the processor 105, send data to the host 125, and receive configuration signals from the host 125.

The host 125 may comprise a computer or microprocessor to control peripheral systems, such as an advanced driver assistance system in an automobile, according to data received from the interface 155 and/or processor 105.

The pre-processor 130 may be configured to receive an input signal from the optical detector 120, amplify the input signal, and/or determine if the input signal exceeds a predetermined value or accept or reject the input signal based on its characteristics (e.g., amplitude or frequency). If the input signal does not exceed the predetermined value, this may indicate that the signal represents noise and may not provide useful data. For example, the pre-processor 130 may comprise an amplifier (e.g., a high frequency amplifier, not shown) and a discriminator circuit (not shown). The pre-processor 130 may produce an output signal (EVENT) only if the input signal exceeds the predetermined value and transmit the output signal to the processor 105 for further processing.

The processor 105 may be configured to receive data (e.g., output signal, EVENT) from the pre-processor, convert the data to time data, build a histogram with the time data, and determine a peak in the histogram. According to an exemplary embodiment, the processor 105 may comprise a time-to-digital converter (TDC) 150 to convert the output signal from the pre-processor 130 to time data. The TDC 150 may comprise a conventional TDC or any other circuit or system suitable for generating a TDC code that represents a time interval. In addition, the TDC 150 may receive the laser clock signal and generate a TDC code for each pulse of the laser clock signal. According to an exemplary embodiment, the TDC code may be represented as a binary code comprising any number of bits. For illustrative purposes, the TDC code is represented by 12 bits, T[11:0].

Figure 3:
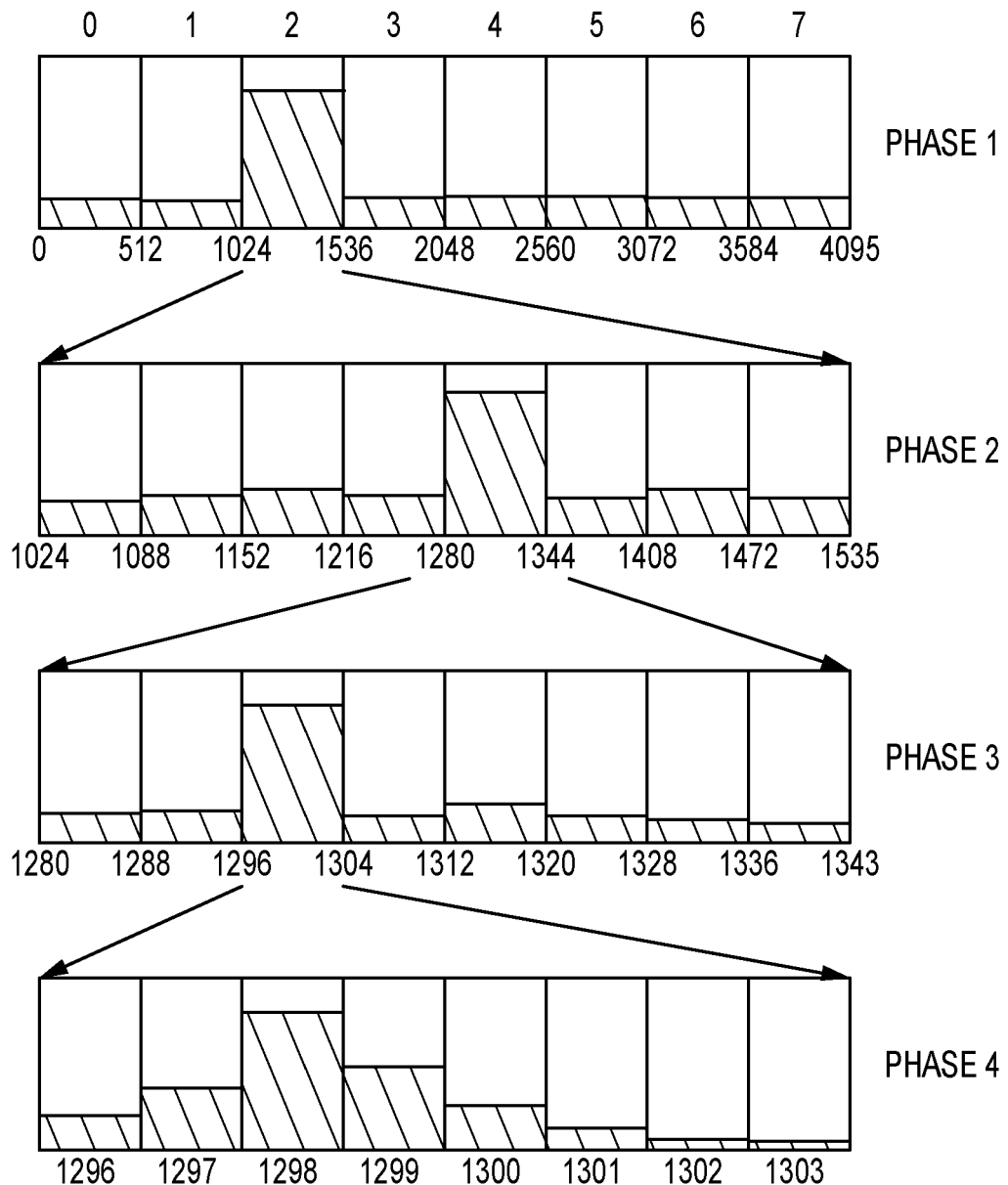
FIG. 3 representatively illustrates selective histogramming in accordance with an exemplary embodiment of the present technology.

According various embodiments, and referring to FIGS. 2 and 3, the processor 105 may further comprise a data algorithm processor 140 that operates in conjunction with the TDC 150. For example, the data algorithm processor 140 may receive the time data from the TDC 150 and generate a histogram having a total number of virtual bins using the time data from the TDC 150 and generate a peak code represented by any number of bits (e.g., a binary code having 12 bits, P[11:0]) that corresponds to the bin number with the highest count value. Since each bin number is associated with a time range, the peak code also indicates a time range. According to various embodiments, the data algorithm processor 140 may be implemented using a field programmable gate array, an application specific integrated circuit, other hardware, and the like, and the data algorithm processor 140 may comprise a number of physical bins (i.e., physical hardware) to histogram groups of virtual bins. According to an exemplary embodiment, the data algorithm processor 140 may comprise a controller 200, a plurality of counters 215, and an encoder 210.

The controller 200 may receive the TDC code from the TDC 150 and perform various operations on the TDC code and generate a clock code represented by any number of bits (e.g., a binary code having 8 bits, C[7:0]) based on the TDC signal. The controller 200 may also receive the phase number and the complete signal from the phase counter 160. For example, the controller 200 may be configured to query particular bit positions in the TDC code based on the phase number. The controller 200 may generate the clock code based on the result of the query and transmit the clock code to the plurality of counters 215. The controller 200 may also receive data from the encoder 210 and use the data from the encoder 210 to query new bit positions in a new TDC code. The controller 200 may be implemented using various hardware, such as logic gates, transistors, and the like. Alternatively, the controller 200 may be implemented using software or a combination of hardware and software.

The plurality of counters 215 may comprise any number of counters, and the counters may increment according to the clock code. In an exemplary embodiment, the plurality of counters 215 comprises 8 counters, wherein a count value of each counter is represented with 8 bits. Each counter, from the plurality of counters 215 may comprise a conventional counter circuit implemented using a number of flip-flops connected in cascade. The count value from each counter may be transmitted to the encoder 210.

The encoder 210 may be configured to receive the count values from the plurality of counters 215, determine the counter with the highest count value, and generate a mask code based on the counter with the highest count value. According to an exemplary embodiment, the mask code may be represented as a binary code comprising any number of bits. For illustrative purposes, the mask code is represented by 3 bits, M[2:0]. The encoder 210 may transmit the mask code to the controller 200.

Various embodiments of the present technology may assemble a histogram using data (e.g., the TDC codes) from the TDC 150 comprising selectively histogramming a number of virtual bins using a number of physical bins over a number of phases and generating an output that represents the virtual bin with the highest count value.

According to an exemplary operation, and referring to FIGS. 1-3, during a first phase (phase 1) the system 100 divides the total number of virtual bins into a number of groups, such that each group contains the same number of virtual bins. For example, the histogram may comprise 4096 virtual bins, where each bin is numbered from 0 to 4095, and each virtual bin of the histogram is defined by a range (time). In the present example, the controller 200 divides the 4096 virtual bins into 8 groups, where each group is numbered 0 to 7. In phase 1, group 0 is defined by virtual bin numbers 0 to 511, group 1 is defined by virtual bin numbers 512 to 1023, group 2 is defined by virtual bin numbers 1024 to 1535, group 3 is defined by virtual bin numbers 1536 to 2047, group 4 is defined by virtual bin numbers 2048 to 2559, group 5 is defined by virtual bin numbers 2560 to 3071, group 6 is defined by virtual bin numbers 3072 to 3583, and group 7 is defined by virtual bin numbers 3584 to 4095. In other embodiments, the histogram may comprise any number of virtual bins and may be divided into any number of groups. Accordingly, each group is further defined by the range of the first and last bins of the respective group and the TDC codes are assigned to a particular group based on a query of the TDC codes. Each group is associated with one counter from the plurality of counters 215 (i.e., group 0 is associated with counter 0, group 1 is associated with counter 1, group 2 is associated with counter 2, group 3 is associated with counter 3, group 4 is associated with counter 4, group 5 is associated with counter 5, group 6 is associated with counter 6, and group 7 is associated with counter 7.

The controller 200 may receive a first set of TDC codes from the TDC 150 and query a portion of the bits of the first set of TDC codes. For example, the controller 200 may only query (i.e., examine and consider) the 3 most significant bits (i.e., bits 11 to 9) of the first set of TDC codes. Based on bits 11 to 9, the controller 200 may generate, for each TDC code, a clock code (e.g., C[7:0]). The counters 215 increment based on the clock codes. After all the TDC codes from the first set of TDC codes have been queried, the encoder 210 generates a first mask code for the counter with the highest count value. In the present example, the counter with the highest count value for phase 1 is counter 2, so the first mask code is 010. The encoder 210 then transmits the first mask code (e.g., 010) to the controller 200.

After a predetermined number of laser clock pulses (and number of TDC codes), the phase counter 160 increments to 2, indicating the start of a second phase (phase 2).

During phase 2, the controller 200 receives a second set of TDC codes and queries the second set of TDC codes using the first mask code (e.g., 010) to determine whether bits 11 to 9 of the second set of TDC codes matches the first mask code. The controller 200 ignores those TDC codes having bits 11 to 9 that do not match the first mask code, and the controller 200 operates only on those TDC codes that have bits 11 to 9 that match the first mask code. Phase 2 considers only those TDC codes that have bits 11 to 9 that match the first mask code, and the controller 200 divides the virtual bins from group 2 again into 8 equal groups. For example, in phase 2, group 0 is defined by virtual bin numbers 1024 to 1087, group 1 is defined by virtual bin numbers 1088 to 1151, group 2 is defined by virtual bin numbers 1152 to 1215, group 3 is defined by virtual bin numbers 1216 to 1279, group 4 is defined by virtual bin numbers 1280 to 1343, group 5 is defined by virtual bin numbers 1344 to 1407, group 6 is defined by virtual bin numbers 1408 to 1471, and group 7 is defined by virtual bin numbers 1472 to 1535.

If bits 11 to 9 of the second set of TDC codes match the first mask code, the controller 200 queries new bits 8 to 6 and generates new clock codes based on bits 8 to 6 and increments the counters 215 accordingly. After bits 8 to 6 from the second set of TDC codes have been queried, the encoder 210 generates a second mask code for the counter with the highest count value. In the present example, the counter with the highest count value is counter 4, therefore the second mask code for phase 2 is 100. The encoder 210 may then transmit the second mask code (e.g., 100) to the controller 200.

After a predetermined number of laser clock pulses (and number of TDC codes, which may or may not be the same number used for phase 1), the phase counter 160 increments to 3, indicating the start of a third phase (phase 3).

During phase 3, the controller 200 joins together (i.e., strings, concatenates) the first mask code and the second mask code (e.g., 010100) and receives a third set of TDC codes. The controller 200 queries the third set of TDC codes using the first and second mask codes to determine whether bits 11 to 6 of the third set of TDC codes matches the first mask code and the second mask code. The controller 200 ignores those TDC codes having bits 11 to 6 that do not match the first and second mask codes, and the controller 200 operates only on those TDC codes that have bits 11 to 6 that match the first and second mask codes. Phase 3 considers only those TDC codes that have bits 11 to 6 that match the first and second mask codes, and the controller 200 divides the virtual bins from group 4 again into 8 equal groups. For example, in phase 3, group 0 is defined by virtual bin numbers 1280 to 1287, group 1 is defined by virtual bin numbers 1288 to 1295, group 2 is defined by virtual bin numbers 1296 to 1303, group 3 is defined by virtual bin numbers 1304 to 1311, group 4 is defined by virtual bin numbers 1312 to 1319, group 5 is defined by virtual bin numbers 1320 to 1327, group 6 is defined by virtual bin numbers 1328 to 1335, and group 7 is defined by virtual bin numbers 1336 to 1343.

If bits 11 to 6 of the third set of TDC codes match the first and second mask codes, the controller 200 queries new bits 5 to 3 and generates new clock codes based on bits 5 to 3 and increments the counters 215 accordingly. After bits 5 to 3 from the third set of TDC codes have been queried, the encoder 210 generates a third mask code for the counter with the highest count value. In the present example, the counter with the highest count value during phase 3 is counter 2, therefore the third mask code for phase 2 is 010. The encoder 210 may then transmit the third mask code (e.g., 010) to the controller 200.

After a predetermined number of laser clock pulses (and number of TDC codes, which may or may not be the same number used for phases 1 and 2), the phase counter 160 increments to 4, indicating the start of a fourth phase (phase 4).

During phase 4, the controller 200 joins together (i.e., strings, concatenates) the first mask code, the second mask code, and the third mask code (e.g., 010100010) and receives a fourth set of TDC codes. The controller 200 queries the fourth set of TDC codes using the first, second, and third mask codes to determine whether bits 11 to 3 of the fourth set of TDC codes matches the first, second, and third mask codes. The controller 200 ignores those TDC codes having bits 11 to 3 that do not match the first, second, and third mask codes, and the controller 200 operates only on those TDC codes that have bits 11 to 3 that match the first, second, and third mask codes. Phase 4 considers only those TDC codes that have bits 11 to 3 that match the first, second, and third mask codes, and the controller 200 divides the virtual bins from group 2 again into 8 equal groups. For example, in phase 4, group 0 is defined by virtual bin number 1296, group 1 is defined by virtual bin number 1297, group 2 is defined by virtual bin number 1298, group 3 is defined by virtual bin number 1299, group 4 is defined by virtual bin number 1300, group 5 is defined by virtual bin number 1301, group 6 is defined by virtual bin number 1302, and group 7 is defined by virtual bin numbers 1303.

If bits 11 to 3 of the fourth set of TDC codes match the first, second, and third mask codes, the controller 200 queries new bits 2 to 0 and generates new clock codes based on bits 2 to 0 and increments the counters 215 accordingly. After bits 2 to 0 from the fourth set of TDC codes have been queried, the encoder 210 generates a fourth mask code for the counter with the highest count value. In the present example, the counter with the highest count value during phase 4 is counter 2, therefore the fourth mask code for phase 3 is 010. The encoder 210 may transmit the fourth mask code (e.g., 010) to the controller 200.

After a predetermined number of laser clock pulses (and number of TDC codes, which may or may not be the same number used for phases 1, 2, and 3), the phase counter 160 generates the complete signal, indicating that the histogramming process is complete, and transmits the complete signal to the controller 200. The controller 200 joins together (i.e., strings, concatenates) the first mask code, the second mask code, the third mask code, and the fourth mask code (e.g., 010100010010) and outputs the code string as the peak code. The peak code indicates the virtual bin with the highest count (in this example 010100010010=bin number 1298).

In various embodiments, the data algorithm processor 140 may transmit the peak code to the control and data recorder 145, where the control and data recorder 145 may convert the peak code (bin number) to a range/distance and report the distance to the host 125 via the interface 155. The host 125 may use the distance information to initiate peripheral functions. For example, in a vehicle equipped with an ADAS, the vehicle may automatically engage the brakes.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An apparatus, capable of receiving TDC codes from a time-to-digital converter (TDC), comprising:
    a controller configured to:
        receive a first set of TDC codes, wherein each TDC code comprises a total number of bits; and
        identify a portion of bits, from the total number of bits, in the first set of TDC codes;
    a plurality of counters responsive to the controller, wherein each counter is configured to increment in value based on the identified portion of bits; and
    an encoder, in communication with the plurality of counters, and configured to:
        identify the counter, from the plurality of counters, with the highest value;
        generate a mask code for the counter with the highest value; and
        transmit the mask code to the controller;
    wherein the controller is further configured to:
        query a second set of TDC codes using the mask code; and
        generate a peak code using the mask code, wherein the peak code represents a single bin number from a plurality of virtual histogram bins.

2. The apparatus according to claim 1, further comprising a phase counter configured to:
    receive a sequence of laser clock pulses;
    generate a phase count value; and
    transmit the phase count value to the controller.

3. The apparatus according to claim 2, wherein the phase count value increments after a predetermined number of laser clock pulses.

4. The apparatus according to claim 1, wherein the controller is further configured to reset the plurality of counters after the predetermined number of laser clock pulses.

5. The apparatus according to claim 1, wherein querying the second set of TDC codes comprises determining whether the portion of bits in the second set of TDC codes contains the mask code.

6. The apparatus according to claim 1, wherein querying the second set of TDC codes comprises ignoring any TDC codes, from the second set of TDC codes, if the portion of bits differs from the mask code.

7. The apparatus according to claim 1, wherein the controller is further configured to generate the peak code using a second mask code.

8. The apparatus according to claim 1, wherein the encoder is further configured to:
    identify the counter, from the plurality of counters, with the second-highest value; and
    generate a third mask code for the counter with the second-highest value.

9. A method for selective histogramming using data from a time-to-digital converter (TDC), comprising:
    dividing a total number of virtual bins into a number of groups; and
    histogramming the total number of virtual bins over a total number of phases, wherein:
        a first phase, from the total number of phases, comprises:
            receiving a first set of TDC values from the TDC, wherein each TDC value is represented by a total number of bits;
            incrementing a plurality of counters based on a first portion of bits from the total number of bits;
            generating a first mask code for the counter with the highest count value; and
            resetting the counter; and
        each subsequent phase, from the total number of phases, comprises:
            dividing a portion of the virtual bins into the number of groups;
            receiving a new set of TDC values from the TDC;
            querying the new set of TDC values using at least the first mask code;
            incrementing the counter based on a new portion of the bits;
            generating a new mask code for the counter with the highest count value; and
            generating a peak code using the mask codes from each phase, wherein the peak code represents a single bin number from the total number of virtual bins.

10. The method according to claim 9, further comprising receiving a sequence of laser clock pulses and incrementing a phase count value after a predetermined number of laser clock pulses.

11. The method according to claim 10, further comprising resetting the plurality of counters after the predetermined number of laser clock pulses.

12. The method according to claim 9, wherein the number of groups is equal to a total number of counters in the plurality of counters.

13. The method according to claim 9, wherein generating the peak code using the mask codes comprises stringing together the mask codes from each phase.

14. The method according to claim 9, wherein querying comprises determining whether the first portion of bits in the new set of TDC codes contains the mask code.

15. The method according to claim 9, wherein querying comprises ignoring any TDC values, from the new set of TDC codes, if the first portion of bits differs from the first mask code.

16. A system, comprising:
a source configured to transmit a source signal;
a receiver configured to receive a reflected source signal and generate a reception signal according to the reflected source signal;
a phase counter having a phase count value that increments after a predetermined number of clock pulses;
a conversion circuit connected to the receiver and configured to convert the reception signal to a binary code that represents time, wherein the binary code comprises a total number of bits; and
a processor connected to the conversion circuit and the phase counter and configured to:
histogram a total number of virtual bins over a plurality of phases using a total number of counters, wherein the total number of counters is less than the total number of virtual bins, comprising:
for each phase:
incrementing the counters based on a portion of bits of the binary code;
generating a mask code for the counter value with the highest value; and
querying a new portion of bits in a new binary code using the mask code; and
stringing together the mask codes from each phase to form a peak code, wherein the peak code represents a single bin number from the total number of virtual bins.

17. The system according to claim 16, wherein querying comprises determining whether the new portion of bits in the new binary code contains the mask code.

18. The system according to claim 16, wherein querying comprises ignoring the new binary code if the new portion of bits differs from the mask code.

19. The system according to claim 16, wherein the processor is further configured to reset the total number of counters after the predetermined number of laser clock pulses.

20. The system according to claim 16, wherein the processor is further configured to divide the total number of virtual bins into a number of groups, and wherein the number of groups is equal to the total number of counters.

* * * * *